US006740395B2

(12) United States Patent
Halm et al.

(10) Patent No.: US 6,740,395 B2
(45) Date of Patent: May 25, 2004

(54) SUBSTRATE SMOOTHED BY COATING WITH GYPSUM-CONTAINING COMPOSITION AND METHOD OF MAKING

(75) Inventors: John D. Halm, Lindenhurst, IL (US); Aida L. Carbo, Barrington, IL (US); Michael R. Lynn, Arlington Heights, IL (US); Richard B. Stevens, Crystal Lake, IL (US); Charles J. Miller, McHenry, IL (US); Peter M. Attard, Elk Grove Village, IL (US); Therese A. Fults, Wood Dale, IL (US)

(73) Assignee: United States Gypsum Company, Chicago, IL (US)

( * ) Notice: Subject to any disclaimer, the term of this patent is extended or adjusted under 35 U.S.C. 154(b) by 165 days.

(21) Appl. No.: 10/037,001

(22) Filed: Dec. 21, 2001

(65) Prior Publication Data

US 2003/0134554 A1 Jul. 17, 2003

(51) Int. Cl.$^7$ ............................................... B32B 21/10
(52) U.S. Cl. ................................ 428/292.4; 428/292.1; 428/304.4; 428/307.3; 428/703; 106/772; 106/773; 106/774; 106/785
(58) Field of Search ........................... 428/304.4, 307.3, 428/703, 292.1, 292.4; 106/773, 774, 785, 772

(56) References Cited

U.S. PATENT DOCUMENTS

| 1,868,372 | A |   | 7/1932  | Swift            |         |
|-----------|---|---|---------|------------------|---------|
| 1,943,757 | A |   | 1/1934  | Delaney          |         |
| 3,192,098 | A |   | 6/1965  | Phillips         |         |
| 3,289,371 | A |   | 12/1966 | Pearson et al.   |         |
| 3,908,062 | A |   | 9/1975  | Roberts          | 428/282 |
| 4,059,456 | A |   | 11/1977 | DeRooy et al.    | 106/114 |
| 4,075,374 | A |   | 2/1978  | Jorgenson et al. | 427/355 |
| 4,626,389 | A |   | 12/1986 | Lempfer et al.   | 264/40.7 |
| 4,661,161 | A | * | 4/1987  | Jakacki et al.   | 106/112 |
| 4,784,816 | A |   | 11/1988 | Sattler          | 264/210.2 |
| 4,955,171 | A |   | 9/1990  | Kossatz et al.   | 52/612  |
| 5,102,596 | A |   | 4/1992  | Lempfer et al.   | 264/115 |
| 5,116,555 | A |   | 5/1992  | Thole et al.     | 264/40.5 |
| 5,202,174 | A |   | 4/1993  | Capaul           | 428/138 |
| 5,320,677 | A | * | 6/1994  | Baig             | 106/780 |
| 5,746,822 | A | * | 5/1998  | Espinoza et al.  | 106/785 |

* cited by examiner

*Primary Examiner*—Deborah Jones
*Assistant Examiner*—Abraham Bahta
(74) *Attorney, Agent, or Firm*—John M. Lorenzen; David F. Janci; Jenkens & Gilchrist

(57) ABSTRACT

A rough-surfaced substrate, such as a fiberboard, is provided with a smoother surface by applying a coating comprising calcium sulfate hemihydrate which has been prevented from hydrating to gypsum by set preventer, and which sets when brought into contact with a set initiator, e.g. aluminum sulfate, preferably present on the surface of the substrate.

11 Claims, No Drawings

SUBSTRATE SMOOTHED BY COATING WITH GYPSUM-CONTAINING COMPOSITION AND METHOD OF MAKING

BACKGROUND OF THE INVENTION

Certain properties of gypsum make it very popular for use in making industrial and building plasters and other building products, especially gypsum wallboard. It is a plentiful and generally inexpensive raw material which, through a process of dehydration and rehydration, can be cast, molded or otherwise formed to useful shapes. It is also noncombustible and relatively dimensionally stable when exposed to moisture. However, because it is a brittle, crystalline material, which has relatively low tensile and flexural strength, its uses are typically limited to non-structural, non-load-bearing and non-impact-absorbing applications.

Gypsum wallboard, also known as drywall, consists of a rehydrated gypsum core sandwiched between multi-ply paper cover sheets and is used largely for interior wall and ceiling applications, as well as other specialty uses. The paper cover sheets contribute significantly to the strength of wallboard; without the paper up to 80% of the flexural strength is lost. Furthermore, because of the brittleness and low nail and screw holding properties of its gypsum core, conventional wallboard by itself cannot support heavy appended loads or absorb significant impact.

A material which may be used to make a wallboard having numerous properties superior to those of paper-covered gypsum wallboard is taught in a patent assigned to United States Gypsum Company, U.S. Pat. No. 5,320,677 (the '677 patent). The '677 patent teaches a gypsum composite material which is strong enough so as not to require a paper covering. The gypsum composite material is made from a combination of gypsum and a "host particle" such as a lignocellulosic material. This combination produces a composite material useful for making strong cast products, plasters, building products and for other applications. The composite material may be used to make a paperless gypsum wallboard also known as "fiberboard". This fiberboard is fire resistant, has non-directional strength, including resistance to nail and screw pull-out throughout its expanse, and a harder finish than paper-covered wallboard. It also has better dimensional stability than paper-covered wallboard and has the ability to maintain its strength even in a humid environment. In addition, fiberboard has fewer defects related to the use of paper, e.g., problems such as the tearing of the paper covering or bubble formation under the paper are eliminated. Finally, fiberboard can be produced at a competitive cost.

A disadvantage of the fiberboard of the '677 patent is that the surface is not as smooth as would be desirable, because of the inclusion of the fibrous lignocellulosic material. A smooth, flat and level surface is preferred for applications such as ceilings and wall assemblies. Current methods used to smooth the rough surface of fiberboard and to minimize the surface imperfections may involve many laborious steps and add significant expense to fiberboard production. Rough-surfaced materials may be covered with conventional paints or coatings to help hide the imperfections, but because these coatings tend to shrink as they dry, the finished surface follows the contours of the rough surface and a flat, level, and smooth surface does not result. Rough-surfaced materials may also be sanded or polished after coating to yield a smooth surface and multiple coating/sanding operations may be needed to produce a smooth surface. Multi-step coating and sanding (or polishing) operations have been used to prepare the surface of fiberboard substrates such as medium density fiberboard. At each coating step, the wet coating must be dried—a process that involves energy and requires physical space on a production line. Multi-step surface preparation procedures require much longer production lines and increase energy costs, as well as adding expense for sanding or polishing materials, and for disposal of waste materials.

If the fiberboard could be coated with a material that does not shrink as it dries, then the rough surface could be covered, leaving a flat, level and smooth surface. It would be possible to make a smooth, flat-surfaced fiberboard in fewer surface preparation steps, e.g., in only one or two steps without sanding or polishing.

In principle, the fiberboard could be coated with calcium sulfate hemihydrate (plaster of Paris), which will convert to calcium sulfate dihydrate (gypsum) when mixed with water, resulting in hardening or setting of the plaster. The reaction inexorably proceeds to completion in a period of time as adjusted by various accelerators and retarders, usually 5–300 minutes after mixing with water. A typical calcium sulfate hemihydrate coating would thus need to be kept in a dry form, then mixed with water just before being used to coat the fiberboard. But, the machinery used to coat the fiberboard would have to be frequently cleaned to remove accumulation of calcium sulfate dihydrate. Thus, using a coating based on calcium sulfate hemihydrate using conventional set control additives is not amenable to a continuous in-line production process. But, if the gypsum composition did not set when mixed with water, constant cleaning of the machine would not be needed. Then, if the gypsum composition only set after being coated on the fiberboard panel, then the desired smooth finish on the rough panel could be achieved.

The present inventors have discovered how to produce a smooth, flat gypsum-coated fiberboard. Their invention includes a paperless fiberboard with a surface acceptable for wall and ceiling applications and a process for making such fiberboard.

SUMMARY OF THE INVENTION

The present invention is a process for preparing a smooth-surfaced gypsum-coated substrate from a rough-surfaced substrate, especially from fiberboard that previously could not be smoothed in an economical manner and the resulting smooth-surfaced substrate.

In one embodiment of the present invention, a rough-surfaced fiberboard substrate is made smooth by the application of a calcium sulfate hemihydrate-containing coating composition with a reverse roll coater. As the fiberboard is fed through a reverse roll coater, a layer of the coating composition is deposited onto the surface of the board where hydration occurs to set the coating. The surface of the finished substrate is smooth, flat and level at the time the fiberboard emerges from the reverse roll coater. Since the coating composition contains a set preventer, it does not set until after deposited on the surface of the fiberboard where an activator initiates the setting reaction only on the panel and not in the coating contained within the reverse roll coater, thus permitting the use of a reverse roll coater for continuous operation. A continuous operation would not be possible using conventional set controlled calcium sulfate hemihydrate coatings, as the setting reaction would proceed inexorably to completion once mixed with water, necessitating shut down of the equipment to clean out the set gypsum in and on the roll coater.

In a preferred embodiment, the set preventers are the non-calcium-bearing phosphate compounds of U.S. Pat. No. 5,746,822. After coating the fiberboard substrate with the coating composition, and the coating composition sets, i.e., the calcium sulfate hemihydrate in the coating composition hydrates to form calcium sulfate dihydrate (gypsum). In order for this setting process to occur, a set initiator must be present, either in or on the surface of the fiberboard, or alternatively introduced into the coating as it is applied. Set initiators include the accelerators of the '822 patent. While it was suggested in the '822 patent that aluminum sulfate and ferrous ion-containing compounds could be used, they were not recommended. However, aluminum sulfate is a preferred set initiator in the present invention. The amount of the set initiator will depend on the amount required to overcome the set preventing effect of the non-calcium-bearing phosphates. Generally, about 0.01 to 0.03 wt % of the set initiator, based on the weight of the coating composition, will be sufficient. Using a very active set initiator such as aluminum sulfate has the advantage of rapidly hydrating the calcium sulfate hemihydrate so that it does not need to be mixed with the coating composition, but may be merely on the surface of the fiberboard.

Where the rough-surfaced substrate to be coated is a gypsum-containing fiberboard material, smoothing the substrate will produce a product having the beneficial properties of the rough-surfaced fiberboard material (uniformly good strength, including resistance to nail and screw pull-out throughout its expanse, dimensional stability, maintenance of strength even in a humid environment, fire resistance, and low cost) and a smooth surface which is amenable to decorative finishes. The surface should be similar to a troweled plaster in its hardness and durability.

Description of Illustrative Embodiments Coating Compositions

The coating composition contains calcium sulfate hemihydrate, but it does not set to form gypsum, even though mixed with water. Thus, continuous production of coated fiberboard is possible. A calcium sulfate hemihydrate-containing coating composition that can be premixed with water off-site and brought to a production line ready for use. Unlike conventional calcium sulfate hemihydrate compositions, the inventive coating composition will not inexorably proceed to set when mixed with water, but the calcium sulfate hemihydrate remains unset indefinitely, even though mixed with water. When desired, the coating composition can be caused to completely set and harden (thereby converting the hemihydrate to calcium sulfate dihydrate) upon contact with a set initiator. In this manner, a gypsum-coated substrate may be created in a continuous production line environment without the need for on-site mixing of a coating composition with water and without the need for using the coating composition immediately after mixing the calcium sulfate hemihydrate with water. Furthermore, because the coating composition will not set unless a set initiator is present, it will not set on the production equipment and thus the equipment does not require removal of set gypsum and may be readily cleaned after use. The wet-mixed coating composition of the present invention can be added into a reverse roll coater and maintained in the unset (calcium sulfate hemihydrate) state until it is desired to initiate the setting reaction. The coating composition of the present invention starts setting only after it had been applied to the substrate. This permits a smooth, flat and level substrate surface to be formed with a minimum of processing steps.

Conventional non-calcium sulfate hemihydrate coatings tend to shrink after application to a substrate as they dry. On shrinking, they follow the contour of the surface and, if the surface is rough, many coats and sanding steps may be needed to yield a smooth, flat substrate. With the present coating composition, there is substantially no shrinkage of the coating as it dries. The coating is thick enough, preferably about 1/32 to 1/16 inches (0.79 to 1.59 mm) to conform to the flat level surface of the reverse roll coater and to cover the rough surface of the fiberboard, thus generating the desired smooth, flat, level substrate.

Non-Calcium Bearing Phosphate Set Retarders

As discussed in the '822 patent, certain non-calcium bearing phosphates have been found to have a long term set preventing effect. The present inventors believe that set prevention better describes the performance of these phosphates, rather than merely "set retarders." Examples of such phosphates include zinc hexametaphosphate, potassium tripolyphosphate, tetra sodium pyrophosphate, sodium tripolyphosphate, monoammonium phosphate, and monobasic potassium phosphate. Tetra sodium pyrophosphate is a preferred set preventer. The amount required may vary from about 0.1 to about 10 wt. % based on the total solids content of the coating, preferably from about 0.2 to about 0.5 wt. %.

Other Additives

The non-calcium bearing phosphate compounds are needed to prevent the calcium sulfate hemihydrate from prematurely setting when in the presence of water. Stiffness is provided by the addition of insoluble particulates, such as clays e.g. sepiolite, bentonite, or attapulgus clays, and mica. The term "stiffness" implies a degree of thixotropic performance useful in the coating compositions. That is, the coating composition is relatively immobile until applied and worked with tools. In addition, the stiffeners add to the workability, and provide a suspending property that maintains a homogeneous mixture and keeps components from settling and prematurely forming an unusable and unworkable mass. Other additives may be included in order to provide other desired properties.

Conventional cellulosic thickeners may be added to adjust the viscosity of the coating composition. They generally do not provide the stiffening property available from clays and mica. Examples include ethylhydroxy ethylcellulose, hydroxypropyl methylcellulose, methylhydroxypropyl cellulose, hydroxyethyl cellulose, and the like. The amount used may vary up to about 1 wt. % of the solids content of the coating as required to meet the desired consistency. Preferably, about 0.35 to about 0.6 wt. %, based on the solids content of the coating composition, will be used.

Latex emulsion binders may be included in coating composition, of the invention. Examples include polyvinyl acetate and ethylene vinyl acetate emulsions. The amount used may range from about 1.5 to about 7 wt. % of the solids content of the joint compound, preferably about 2 to about 5.5 wt. %.

Reduced weight may be provided by addition of lightweight spheres, such as an expanded perlite or resin microspheres. Fibers may also be added, if desired.

Other additives which may have use in joint compounds of the invention include talc, citric acid, fungicides, and bactericides. Wetting agents, defoamers, and plasticizers may also be included.

Set Initiators

Set initiators, also called accelerators in the '822 patent, contain at least one compound which has a log K value greater than calcium. Log K is the logarithm of the equilibrium constant K of the chelating reaction of diethylene triamine pentaacetic acid with a given metal cation. Table I in the '822 patent provides a list of metal ions and their log K values. Zinc sulfate was considered to be a superior set initiator, although the numerical difference between zinc and calcium in Table I was not the largest shown. While it was suggested in the '822 patent that aluminum sulfate and ferrous ion-containing compounds were not recommended since they have detrimental effects, aluminum sulfate is a preferred set initiator in the present application. The amount of the set initiator will depend on the amount required to overcome the set preventing effect of the non-calcium bearing phosphates. Generally, about 0.01 to 0.03 wt. % of the set initiator, based on the weight of the premixed first part of the coating compound, will be used. It has been found that a very active set initiator, such as aluminum sulfate, does not have to be mixed with the coating compound, but by merely being on the surface of the substrate, causes the setting reaction to occur throughout the coating.

Although the reasons for the effectiveness of the set preventers described above are not fully known, it is believed that they function by sequestering calcium ions and/or calcium compounds, inhibiting crystal growth. It is believed that the set initiators function by preferentially binding to the set preventer, freeing the calcium ions and/or calcium compounds to initiate the setting reaction and crystal growth.

When set initiators are used with ready-mixed setting-type joint compounds, it is typical that they are mixed thoroughly with the ready-mixed joint setting-type compound just prior to use. A colorant may be included to help assure complete mixing. In the present use, the ready-mixed coating composition could be mixed with a set initiator as it is applied, but preferably, the set initiator is included in the gypsum formulation used in making the fiberboard or is applied to the top of the fiberboard as it is curing. It has been found that aluminum sulfate is sufficiently active so that its presence on the surface of the fiberboard is sufficient to begin the setting process, which then proceeds throughout the coating layer.

Typical coating compositions of the present invention are represented by the formulations listed in Table 1.

TABLE 1

| Component | Amount (wt. %) |
| --- | --- |
| Calcium sulfate hemihydrate (alpha[1]) | 80.0–90.0 |
| Mica[2] | 2.5–8.0 |
| Attapulgite clay[3] | 1.0–5.0 |
| Hydroxypropyl methylcellulose[4] | 0.35–0.6 |
| Tetrasodium pyrophosphate | 0.25–0.5 |
| Citric acid | 0.1–0.25 |
| Polyvinyl acetate latex[5] | 4.0–7.0 |
| Fungicide[6] | 0.1 |
| Bactericide[7] | 0.1 |

[1]Hydrocal U.S. Gypsum trademark
[2]P-80F Mica, USG Corporation
[3]Gel B, Super Gel B, Milwhite
[4]Dow Chemical
[5]CPS 716 Reichnold Chemical
[6]Fungitrol 158, Troy Chemical
[7]Nuosept 91, Crea Nova Fiberboard A rough-surfaced fiber-containing substrate may be made smooth by the application of the calcium sulfate hemihydrate-containing coating composition described above. Such a fiber-containing substrate may be prepared by the method taught in U.S. Pat. No. 5,320,677 (Baig) assigned to United States Gypsum Company. In the '677 method, host particles are used to strengthen gypsum in the preparation of the fiber-containing substrate. The host particles that may be used are any macroscopic particle such as a fiber, chip or flake of a substance other than gypsum. The particle is generally insoluble in the gypsum-containing slurry and may also have accessible voids on the surfaces such as pits, cracks, fissures, hollow cores or other surface imperfections which are penetrable by the slurry and within which calcium sulfate crystals can form. A lignocellulosic fiber, particularly a wood fiber, is an example of a host particle especially well-suited for the composite material and process of this invention. Another readily available and affordable material that is also widely used in building products is lignocellulosic material, particularly wood and paper fibers. Particle board, fiberboard, waferboard, plywood and hardboard (i.e., high density fiberboard) are some of the forms of processed lignocellulosic material products used in the building industry.

To prepare the fiber-containing substrate, uncalcined ground gypsum and the host particles are mixed together with sufficient liquid to form a dilute slurry consisting of at least about 70% by weight liquid. The mixture is then heated under pressure to calcine the gypsum, converting it to acicular calcium sulfate alpha hemihydrate crystals. The material can be dried immediately before it cools to provide a stable, but rehydratable hemihydrate composite for later use. Alternatively, if it is to be directly converted into a usable product form right away, such as fiberboard, the composite can be further separated from substantially all the liquid except that needed for rehydration, combined with other like composite particles into a desired shape, and then rehydrated to a set and stabilized gypsum composite mass. An optional step in the process is the continuous agitation of the slurry while the gypsum is being calcined and the hemihydrate crystals are forming.

As described in the '677 patent, after the conversion of gypsum to the hemihydrate has been completed, the slurry of hemihydrate and fibers may be discharged onto a dewatering conveyor and cooled and pressed to form a fiberboard while rehydration to gypsum is occurring. Various additives may have been added to the slurry, including aluminum sulfate, which serves as an accelerator and also serves as a set initiator for the coating composition when it is applied to the fiberboard surface.

Application of the Coating

While in principle any method could be used to apply the coating to the surface of the fiberboard, for commercial applications coating equipment designed for that purpose will be needed. One such is the reverse roll coater, which deposits the coating and uses a roller to spread the coating as the roller turns in a direction opposite to the movement of the fiberboard conveyer.

One example of a reverse roll coater is made by Black Bros: Model 222 Reverse Roll Filler. The equipment is designed to apply various types of coatings to sheet materials. The sheet material is transported by feed rolls below, while the coating is applied by a coating roll to the upper surface. The coating roll receives the coating material from a doctor roll which meters the coating. While the coating roll rotates in the same direction as the sheet material is moving, the excess coating is removed by a wiping roll rotating in the opposite direction (i.e. a reverse roll). Lower rolls support and feed the sheet material at a constant speed while a wiping blade removes and recycles the excess coating.

EXAMPLE 1

Fiber-containing boards were prepared by the method described in U.S. Pat. No. 5,320,677. Gypsum and fibers were mixed in a slurry, heated to convert the gypsum to the hemihydrate, dewatered, and the hemihydrate converted back to the dihydrate (gypsum).

EXAMPLE 2

The fiber-containing boards prepared in Example 1 were coated with a coating composition having the formulation of Table 2 plus enough water to provide a workable slurry. Allowable slurry for reverse roll coating was obtained between 150–500 Brabender Unit (BU) viscosity (Brabender Viscocorder VC=3, 250 cm-gm torque head, probe "A"). Percent solids at 520 BU was 69.14%.

TABLE 2

| Component | Amount (wt. %) |
|---|---|
| Calcium sulfate hemihydrate (alpha crystal) | 85.85 |
| Mica | 3.04 |
| Attapulgite clay | 3.94 |
| Hydroxypropyl methylcellulose | 0.5 |
| Tetrasodium pyrophosphate | 0.4 |
| Citric acid | 0.1 |
| Polyvinyl acetate latex | 5.97 |
| Fungicide | 0.1 |
| Bactericide | 0.1 |

The boards were coated by running the panels through a reverse roll coater made by Black Bros. Up to three layers were applied. The aluminum sulfate present in the boards served as a set initiator. Setting action of the coating onto the surface of the panels was completed within 2–6 minutes after passing through the reverse roll coater. The calcium sulfate hemihydrate retained its fluidity within the coater and the coating only set after contacting the set initiator present in/on the board.

EXAMPLE 3

The smoothness of a control board from Example 1 and coated boards from Example 2 was determined by laser scanning, which measures the roughness as the laser beam traverses the surface. The data gathered was analyzed by averaging the individual measurements over distances selected to indicate certain types of surface roughness.

The laser scanning results confirm visual inspections that the board became smoother as additional coats were applied. The laser scanning results were analyzed using an algorithm (details) which accounts for the types of roughness found in fiber-containing boards. The different elements consist of Rw (wave effect relating to the variation in coating thickness found by a 1" scan), Rc (clumping effect of fibers found by a 0.25" scan), Rk (wire knuckle mark relating to the wire screen used in forming the fiberboard and found by a 0.03" scan), Rf (fiber raising effect related to individual fibers and found by a 0.00157" scan), and Rs (the sum of all the effects). Each board was scanned three times and the average values of each scan set are listed in Table 3. The units are arbitrary for comparison purposes and do not represent ordinary units of length, such as inches or millimeters.

TABLE 3

| Coating | Rw (waviness) | Rc (clumping) | Rk (wire knuckle mark) | Rf (fiber raising) | Rs (composite smoothness) |
|---|---|---|---|---|---|
| None (rough control board) | 1.991 | 1.877 | 1.525 | 0.879 | 6.272 |
| Single pass | 1.167 | 1.097 | 0.911 | 0.610 | 3.785 |
| Double pass | 1.030 | 0.971 | 0.789 | 0.515 | 3.306 |
| Triple pass | 0.995 | 0.838 | 0.696 | 0.475 | 3.003 |

The lower R values correspond to smoother boards. For comparison: this method of analysis measures wallboard smoothness at an Rs of about 2.5.

A second trial was conducted with twenty (20) pieces of 2'×4'×⅝" panels (0.61 m×1.22 m×15.87 mm) (with tapers) with no core treatment as well as two core treated samples which included 1.5–3 wt % wax to improve water resistance of the panels. The panels contained about 82–90 wt % gypsum and 8–10 wt % fiber. Potassium sulfate and aluminum sulfate were included as set accelerators at less than 1%. The boards were laser scanned prior to the trial to obtain the base smoothness and after each coat was applied. The results appear in Tables 4 and 5. Again, the lower numbers indicate smoother boards.

TABLE 4

Core Treated Panels

| Coating | Rw (waviness) | Rc (clumping) | Rk (wire knuckle mark) | Rf (fiber raising) | Rs (composite smoothness) |
|---|---|---|---|---|---|
| None (rough control board) | 1.193 | 1.116 | 0.898 | 0.553 | 3.759 |
| Single pass | 1.107 | 1.033 | 0.849 | 0.593 | 3.582 |
| Double pass | 0.740 | 0.713 | 0.623 | 0.422 | 2.497 |
| Triple pass (set 4 minutes between coats) | 0.909 | 0.834 | 0.718 | 0.485 | 2.946 |
| Triple pass (no setting between coats) | 1.018 | 0.912 | 0.684 | 0.476 | 3.089 |
| Double Pass Low viscosity (250 BU) | 0.993 | 0.969 | 0.858 | 0.570 | 3.390 |

TABLE 5

Non-Core Treated Panels

| Coating | Rw (waviness) | Rc (clumping) | Rk (wire knuckle mark) | Rf (fiber raising) | Rs (composite smoothness) |
|---|---|---|---|---|---|
| Control | 1.437 | 1.319 | 1.114 | 0.645 | 4.514 |
| Single pass | 1.140 | 1.004 | 0.753 | 0.479 | 3.376 |
| Double pass | 0.815 | 0.770 | 0.664 | 0.449 | 2.699 |
| Triple pass | 0.854 | 0.793 | 0.665 | 0.441 | 2.754 |
| Triple pass (no setting between costs) | 0.689 | 0.665 | 0.582 | 0.411 | 2.348 |
| Single Pass Low viscosity (250 BU) | 1.269 | 1.183 | 0.950 | 0.592 | 3.994 |
| Double Pass Low viscosity (250 BU) | 1.181 | 1.056 | 0.864 | 0.540 | 3.640 |

In general, it can be seen that, as expected, adding coats improved the smoothness of the surface of the panels. The third pass in this test appeared to increase roughness. Although not entirely understood, it is believed that adjustment of the rolls which determine the coating thickness may have been responsible for these results.

Several lists were made with a thinner coating (250 BU viscosity) and are also reported. When practicing the invention, those skilled in the art will appreciate that the viscosity of the coating may be adjusted to suit the roughness of the panel being coated.

Although not evident from Tables 4–5, it was found that the treatment of the panel with wax delayed the setting of the coating compared to the panels without the wax treatment. However, both panels were found to be able to set the coating within 2–5 minutes, using the accelerator present in the core panel, which migrates into the coating.

The foregoing description and examples are not intended to limit the scope of the invention, which is defined by the claims which follow.

What is claimed is:

1. A smooth-surfaced, gypsum-coated substrate prepared by the process comprising the steps of:
   (a) applying a coating composition to a rough-surfaced substrate, and
   (b) allowing the coating composition to set wherein said rough-surfaced substrate comprises a set initiator and said coating composition comprises calcium sulfate hemihydrate, and a set preventer capable of preventing the coating composition from setting until the coating composition comes into contact with the set initiator present in the rough-surfaced substrate.

2. The smooth-surfaced substrate of claim 1 wherein the rough-surfaced substrate comprises a gypsum-containing material.

3. The smooth-surfaced substrate of claim 2 wherein the rough-surfaced substrate contains fiber.

4. The smooth-surfaced substrate of claim 3 wherein the fiber is a lignocellulosic fiber.

5. The smooth-surfaced substrate of claim 2 wherein the rough-surfaced substrate is a fiberboard.

6. The smooth-surfaced substrate of claim 1 wherein the calcium sulfate hemihydrate is present in the coating composition in an amount from about 20 to about 99 wt. % (based upon total solids used to form the composition), and wherein the coating composition further comprises a calcium carbonate filler, from about 1 to about 10 wt. % (based upon total solids used to form the composition) of a sepiolite, bentonite, or attapulgus clay, from about 0.1 to about 10 wt. % (based upon total solids used to form the composition) of the set preventer is a non-calcium-bearing phosphate, a binder and sufficient water to form a workable slurry.

7. The smooth surface substrate of claim 1 wherein the coating composition comprises 80.0–90.0 wt. % calcium sulfate hemihydrate, 2.5–8.0 wt. % mica, 1.0–5.0 wt. % attapulgite clay, 0.35–0.6 wt. % hydroxypropyl methylcellulose, 0.25–0.5 wt. % tetrasodium pyrophosphate, 0.1–0.25 wt. % citric acid, 4.0–7.0 wt. % polyvinyl acetate latex, about 0.1 wt. % fungicide and about 0.1 wt. % bactericide.

8. The smooth-surfaced substrate of claim 6 wherein the set preventer is tetrasodium pyrophosphate.

9. The smooth-surfaced substrate of claim 1 wherein the set initiator was added to the substrate during its formation as an accelerator.

10. The smooth-surfaced substrate of claim 1 wherein the set initiator is aluminum sulfate.

11. A The smooth-surfaced substrate of claim 1 wherein the thickness of said coating composition applied to said rough-surfaced substrate is about 0.79 to 1.59 mm.

* * * * *

UNITED STATES PATENT AND TRADEMARK OFFICE
CERTIFICATE OF CORRECTION

PATENT NO. : 6,740,395 B2 Page 1 of 1
DATED : May 25, 2004
INVENTOR(S) : Halm et al.

It is certified that error appears in the above-identified patent and that said Letters Patent is hereby corrected as shown below:

Column 10,
Line 24, please delete the letter "A" at the beginning of the claim.

Signed and Sealed this

Ninth Day of August, 2005

JON W. DUDAS
*Director of the United States Patent and Trademark Office*